United States Patent [19]

Ogiwara

[11] Patent Number: 4,605,105

[45] Date of Patent: Aug. 12, 1986

[54] BRAKE SYSTEM

[75] Inventor: Osao Ogiwara, Hanyu, Japan

[73] Assignee: Akebono Brake Industry Co., Ltd., Tokyo, Japan

[21] Appl. No.: 616,648

[22] Filed: Jun. 4, 1984

Related U.S. Application Data

[63] Continuation-in-part of Ser. No. 524,215, Aug. 18, 1983, abandoned.

[30] Foreign Application Priority Data

Sep. 3, 1982 [JP] Japan .................. 57-153750

[51] Int. Cl.$^4$ ............................. F16D 69/02
[52] U.S. Cl. .................... 188/251 M; 188/251 A; 188/255; 523/149; 523/152; 523/155; 524/785
[58] Field of Search ............ 523/149, 152, 155; 188/251 A, 251 M, 255

[56] References Cited

U.S. PATENT DOCUMENTS

| | | | |
|---|---|---|---|
| 2,569,539 | 10/1951 | Schultz | 523/149 |
| 3,835,118 | 9/1974 | Rhee et al. | 523/155 |
| 3,856,120 | 12/1974 | Kwolek | 188/251 A |
| 3,959,194 | 5/1976 | Adelmann | 188/251 A |
| 4,051,097 | 9/1977 | Aldrich | 523/155 |
| 4,166,521 | 9/1979 | Okunishi | 188/251 M |
| 4,278,584 | 7/1981 | Noguchi | 523/155 |
| 4,324,706 | 4/1982 | Tabe | 523/149 |
| 4,363,884 | 12/1982 | Ogiwara | 523/155 |
| 4,369,263 | 1/1983 | Matsushima | 523/152 |
| 4,373,037 | 2/1983 | Washabaugh | 523/155 |
| 4,373,038 | 2/1983 | Moraw | 523/155 |
| 4,374,059 | 2/1983 | Wagner | 523/149 |
| 4,384,054 | 5/1983 | Moraw | 523/155 |
| 4,386,168 | 5/1983 | Fujimaki | 523/155 |
| 4,403,047 | 9/1983 | Albertson | 523/155 |
| 4,420,067 | 12/1983 | Yamamoto | 188/251 A |

FOREIGN PATENT DOCUMENTS

| | | | |
|---|---|---|---|
| 0111373 | 7/1981 | Japan | 523/155 |
| 6161428 | 12/1981 | Japan | 523/149 |

OTHER PUBLICATIONS

Rose, *The Condensed Chemical Dictionary*, 7th Ed., p. 515; Reinhold Pub. Corp., N.Y., 1966.

Primary Examiner—C. Warren Ivy
Attorney, Agent, or Firm—Armstrong, Nikaido, Marmelstein & Kubovcik

[57] ABSTRACT

A brake system of a semi-metallic friction material and a braking component is characterized in that the friction material contains a metallic fiber and/or a metallic powder, a part or all of which has a lower hardness than that of the braking component.

5 Claims, 2 Drawing Figures

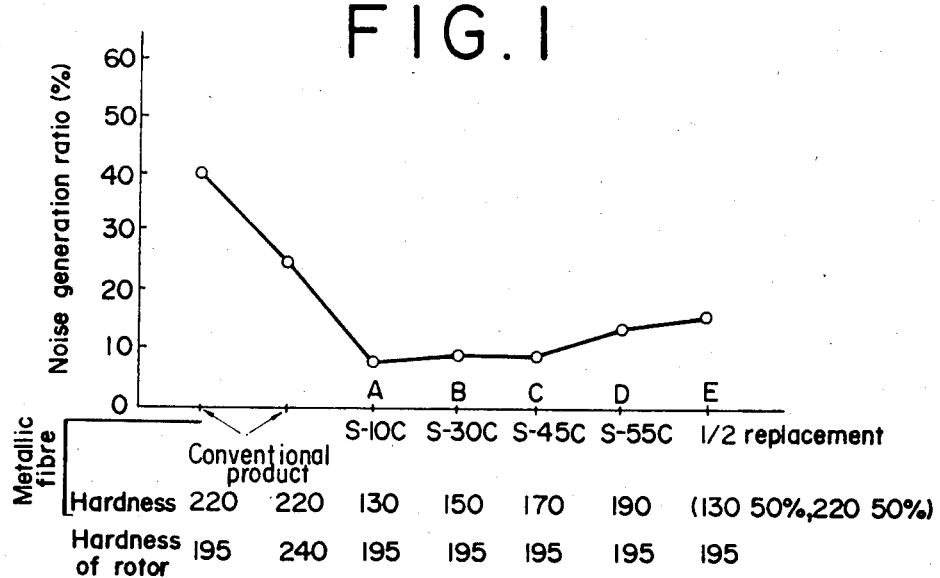
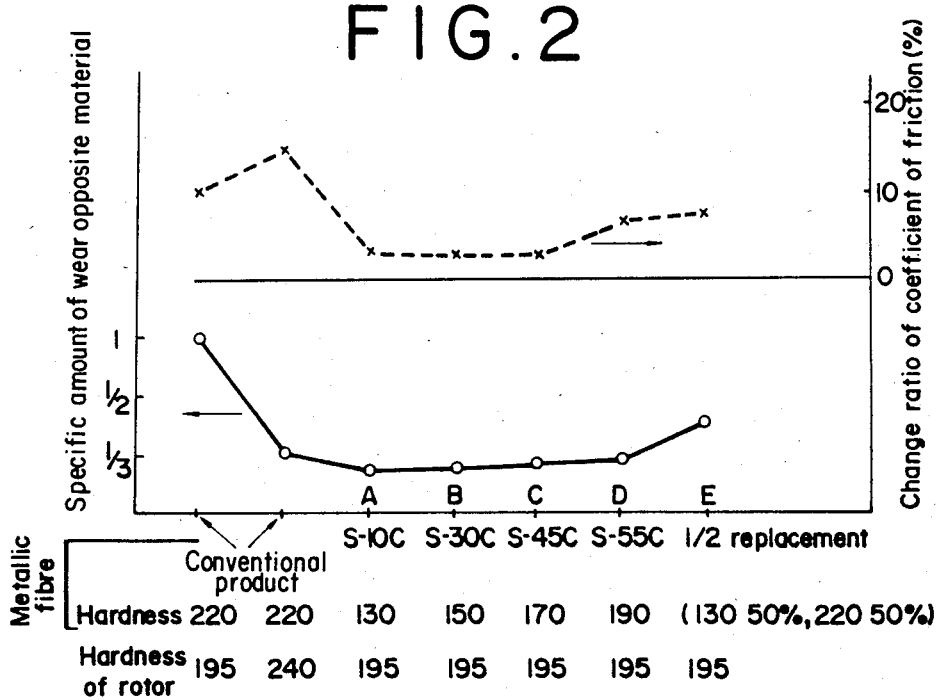

BRAKE SYSTEM

This application is a continuation-in-part application of Ser. No. 524,215, filed Aug. 18, 1983, now abandoned.

BACKGROUND OF THE INVENTION

The present invention is directed to an improvement in a brake system which includes, in combination, a semi-metallic friction material and a braking component, the semi-metallic friction material containing metallic fiber and/or metallic powder as a main constituent. More particularly, the invention is directed to an improvement in the above-described brake system, wherein the improvement is the use of metallic fiber and/or metallic powder having a hardness lower than that of the braking component as a main constituent of the semi-metallic friction material. The use in the semi-metallic friction component of metallic fiber and/or metallic powder having a hardness lower than that of the braking component in the brake systems of automobiles, industrial machinery and railway vehicles, results in stabilization of the coefficient of friction together with lowering of the attack of the semi-metallic friction material against the brake component during braking action and suppressing of the noise generation ratio.

Generally, an FC material (cast iron) is used for the braking component in a brake system which includes a semi-metallic friction material. The hardness of it lies ordinarily within a range of Hv 170 to Hv 250, where Hv is Vickers hardness. FC is used to designate cast iron prescribed by JIS G 5501 of the Japanese Industrial Standards. Materials prescribed by JIS G 5501 correspond to those prescribed by ASTM A 48-76. The braking action made by a friction material containing steel wool and a metallic powder of a high hardness results in worsening the stability of the coefficient of friction as well as in attacking of the brake component and the generation of much noise.

SUMMARY OF THE INVENTION

This invention is directed to overcoming the above problems and provides an improved brake system of a semi-metallic friction material and a braking component, i.e., a frictionally opposite material, wherein the semi-metallic friction material contains a metallic fiber and/or a metallic powder and wherein the metallic fiber and/or metallic powder has a Vickers hardness within a range of Hv 100 to Hv 170 and lower than that of the braking component. In another embodiment, in the semi-metallic friction material containing a metallic fiber and/or a metallic powder, approximately half of the metallic fiber and/or metallic powder has a Vickers hardness of about Hv 220 of ordinary hardness and the other half thereof has a Vickers hardness within a range of Hv 100 to Hv 170 and lower than that of the braking component.

The braking component of the present invention is typically a FC material (cast iron) having a minimum value of Vickers hardness of about Hv 170. Therefore, the metallic fiber and/or the metallic powder in the semi-metallic friction material can be used in all cases if they have a hardness less than Hv 170. However, if the hardness of the braking component increases, the coefficient of friction may decrease in some cases, and therefore it is preferable in practice to use a metallic fiber or a metallic powder having a hardness value that differs from the hardness of the braking component by at least 5 and, preferably, by at least 10, in terms of Vickers hardness.

With regard to the metallic fiber, it is preferable to use fibers of not more than $100\mu$ in mean fiber diameter and not more than 7 mm in mean fiber length.

In the brake system of the present invention having the improved semi-metallic friction material, the attacking property against the braking component is decreased and, as a result, the coefficient of friction is stabilized and it is difficult to generate noise.

The invention will be explained in further detail in conjunction with the following examples and the accompanying drawings.

BRIEF DESCRIPTION OF THE DRAWINGS

FIG. 1 is a graph showing noise generation ratio of a conventional brake system and a brake system of the present invention.

FIG. 2 is a graph showing the amount of wear of the braking component and the change ratio of the coefficient of friction of the conventional brake system and the brake systems of the present invention. The solid line illustrates the amount of wear of the brake component and the broken line illustrates the change ratio of coefficient of friction.

EXAMPLES

In a conventional general compound of a semi-metallic friction material comprising 10–70 vol. % of metallic fiber, 2–15 vol. % of ceramic powder, 19–39 vol. % of graphite particle and, as the balance, a thermosetting resin binder, steel wool was used as the metallic fiber and the entire amount (Examples A, B, C and D) and half of the amount (Example E) by weight of the steel wool was substituted by one having a hardness lower than that of the frictionally opposite material, i.e., the braking component (rotor). These semi-metallic friction material specimens were subjected to a road test and a full-sized dynamometer test to examine the attacking property against the frictionally opposite material, i.e., the braking component, and the stability of the coefficient of friction.

Here, the road test and the full-sized dynamometer test were carried out according to JASO C 402 (Service Brake Road Test Procedure—Passenger Car) and JASO C 406 (Braking device Dynamometer Test Procedure—Passenger Car), respectively, prescribed by Japanese Automobile Standards Organization of the Society of Automobile Engineers of Japan.

The metallic fibers used in the examples were carbon steel fiber designated S-10C, S-30C, S45C and S-55C according to Standard No. JIS G 4051 of the Japanese Industrial Standards. These materials correspond to those prescribed by the American Iron and Steel Institute as AISI 1010, AISI 1030, AISI 1045 and AISI 1055, respectively.

Results of the tests are shown in FIG. 1 as the noise generation ratio, and in FIG. 2 as the specific amount of wear of the brake component and the change ratio of coefficient of friction. For the road test, a Bluebird (a passenger car having an engine displacement of 1.6 to 1.8 liters, manufactured by Nissan Automobile Co.) was employed, and the full-sized dynamometer test was conducted employing AD-Model 57 (a slide caliper type disk brake, manufactured by Akebono Brake Industries Co.).

What is claimed is:

1. In a brake system comprising a semi-metallic friction material component and a braking component which frictionally contacts said friction material component during braking action, the semi-metallic friction material containing 10-70 vol % of a metallic fiber and/or a metallic powder, conventional additives and a thermosetting resin binder, the improvement wherein at least 50% of the metallic fiber and/or the metallic powder in said friction material has a Vickers hardness of Hv 100 to Hv 170 and is selected from the group consisting of steel wool and sponge iron powder, said braking component is cast iron having a Vickers hardness greater than Hv 170, and the Vickers hardness of said steel wool and sponge iron powder is at least Hv 5 lower than the Vickers hardness of said braking component.

2. The brake system of claim 1 wherein the sponge iron comprises at least 50% by weight of the total amount of steel wool and sponge iron.

3. The brake system according to claim 1, wherein said conventional additives comprise 2-15 vol % of ceramic powder and 19-39 vol % of graphite particles.

4. The brake system of claim 1, wherein the Vickers hardness of said steel wool and sponge iron powder is at least Hv 10 lower than the Vickers hardness of said braking component.

5. The brake system according to claim 1, wherein said steel wool has a mean fiber diameter of not more than 100μ and a mean fiber length of not more than 7 mm.

* * * * *